United States Patent [19]

Horiuchi et al.

[11] Patent Number: 4,872,805
[45] Date of Patent: Oct. 10, 1989

[54] WATER POWERED DEVICE

[75] Inventors: Kotaro Horiuchi, Hamamatsu; Masato Suzuki, Iwata, both of Japan

[73] Assignee: Yamaha Hatsudoki Kabushiki Kaisha, Iwata, Japan

[21] Appl. No.: 115,339

[22] Filed: Nov. 2, 1987

Related U.S. Application Data

[62] Division of Ser. No. 792,970, Oct. 30, 1985, Pat. No. 4,737,070.

[30] Foreign Application Priority Data

Jul. 31, 1985 [JP] Japan .................. 60-167638
Jul. 31, 1985 [JP] Japan .................. 60-167639

[51] Int. Cl.$^4$ ............................................. F03B 7/00
[52] U.S. Cl. ...................... 415/7; 415/906; 415/3.1; 416/86; 416/55
[58] Field of Search .............. 415/2 R-4 R, 415/7; 416/84-86, 55, 63, 185, 238

[56] References Cited

U.S. PATENT DOCUMENTS

| | | | |
|---|---|---|---|
| 1,893 | 12/1840 | Burnham | 416/84 X |
| 173,544 | 2/1876 | Huxford | 416/85 |
| 482,034 | 9/1892 | Beery | 416/86 |
| 537,921 | 4/1895 | Fernandez | 416/86 |
| 919,829 | 4/1909 | Cummings | 416/86 |
| 1,017,860 | 2/1912 | Dungan | 416/86 |
| 1,263,865 | 4/1918 | Dale | 415/7 |
| 1,296,792 | 3/1919 | Gracey | 416/85 |
| 1,460,495 | 7/1923 | Molander | 416/85 X |
| 2,097,286 | 10/1937 | McGee | 416/197 A X |
| 2,222,790 | 11/1940 | Van Scharrel | 416/86 X |
| 2,730,631 | 1/1956 | Dandini | 416/84 |
| 4,264,276 | 4/1981 | Massey | 416/86 |
| 4,279,603 | 7/1981 | Harcourt et al. | 416/86 X |
| 4,383,182 | 5/1983 | Bowley | 416/85 X |

FOREIGN PATENT DOCUMENTS

| | | | |
|---|---|---|---|
| 170460 | 2/1952 | Austria | 416/84 |
| 2446980 | 4/1976 | Fed. Rep. of Germany | 416/86 |
| 2813141 | 10/1978 | Fed. Rep. of Germany | 416/86 |
| 3324672 | 1/1985 | Fed. Rep. of Germany | 416/85 |
| 717946 | 1/1932 | France | 415/7 |
| 1005948 | 4/1952 | France | 415/2 R |
| 2338184 | 8/1977 | France | 416/84 |
| 1346 | 1/1977 | Japan | 416/85 |
| 69768 | 5/1980 | Japan | 416/11 |
| 701716 | 12/1953 | United Kingdom | 415/7 |
| 1518268 | 7/1978 | United Kingdom | 416/86 |

Primary Examiner—Everette A. Powell, Jr.
Attorney, Agent, or Firm—Ernest A. Beutler

[57] ABSTRACT

A number of embodiments of water powered devices that are adapted to be positioned in a stream of moving water and which carry water wheels for driving a driven device. The driven device may comprise a generator and a number of embodiments are illustrated for holding the generator against rotation and for absorbing its torque loading. In addition, a device is provided for insuring buoyancy of the device so that the water wheels float with their axis above the level of water. In some embodiments, the buoyant device comprises a buoyant float that also provides a hydrodynamic lift and a hydrodynamic force for carrying the device to the center of the stream. In other embodiments, the device comprises a hydrodynamic device that provides both the lift and the transverse force. An arrangement is disclosed which permits stacking of the water wheels for ease of packing and additionally an arrangement is disclosed for permitting replacement of individual blades of the water wheels. Various ganging arrangements are also disclosed.

20 Claims, 14 Drawing Sheets

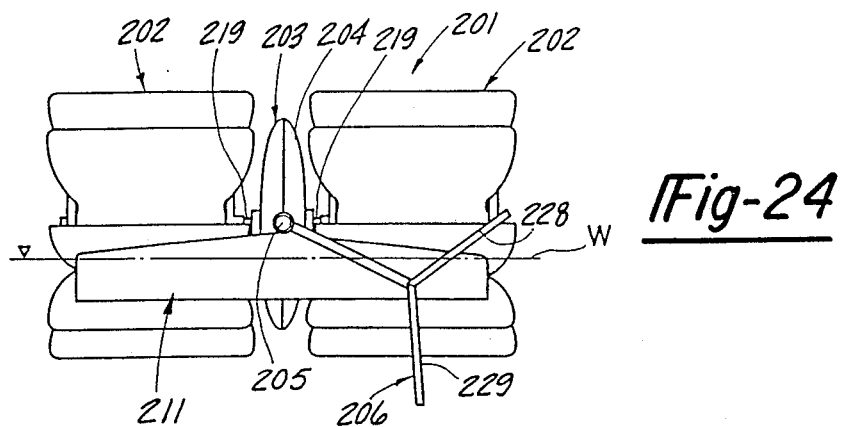
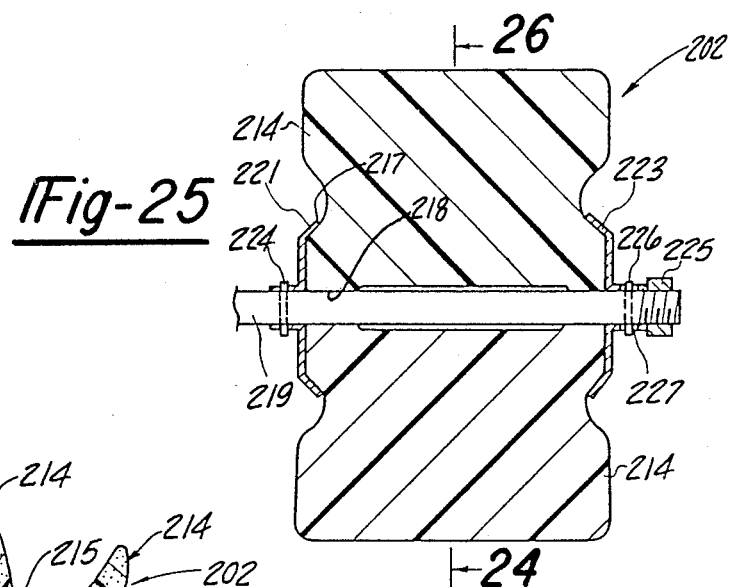
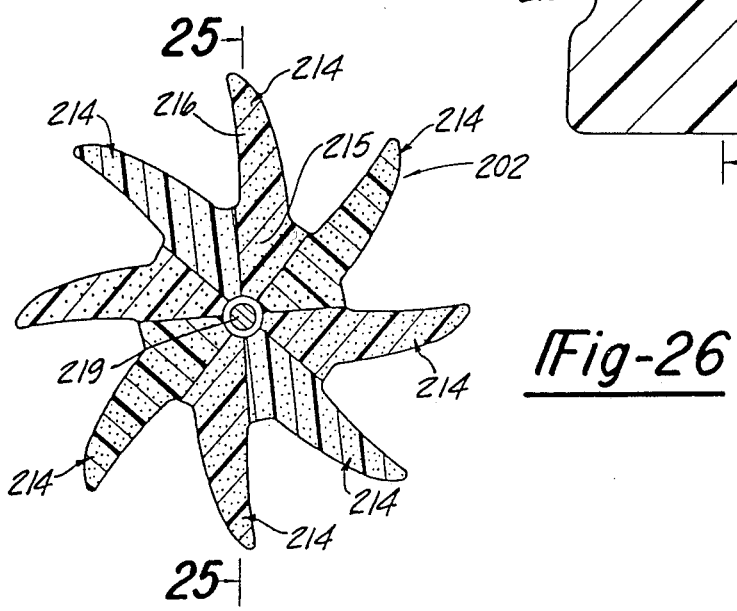

WATER POWERED DEVICE

This is a division of application Ser. No. 792,970, filed Oct. 30, 1985, now U.S. Pat No. 4,737,070.

BACKGROUND OF THE INVENTION

This invention relates to a water powered device and more particularly to an improved device that is designed to be driven which floating in a moving stream of water.

In many instances, an individual may find himself at a remote location but in proximity to a moving stream of water such as a river or the like. It is particularly desirable if the individual can have with him a device which can be placed into the floating stream of water and which can utilize the power of the water movement to drive a device such as a generator, water pump or the like. An apparatus of this general type is disclosed in Japanese Utility Model Application No. 206779/1982.

Although devices that serve this general purpose have particular utility, that disclosed in noted published Japanese utility model application have a number of disadvantages. For example, the arrangement shown in that device employs a number of water driven propellers that rotate about an axis that extends parallel to the direction of water flow. As a result, these devices must be operated in a generally submerged state and, further, if large amounts of power are generated, there must be some arrangement for restraining the device against rotation due to the torque forces on the generator. However, frequently the stream in which the generator is placed is very narrow and the narrowness of the stream does not permit the use of a sufficient lever arm so as to resist the torque.

It is, therefore, a principal object of this invention to provide an improved water powered device.

It is a further object of this invention to provide a water powered device that may be moored within a moving stream of water and which employs water wheels that rotate about an axis that extends transversely to the direction of flow of the water.

As has been previously noted, certain types of water powered devices generate a torque which must be resisted so as to prevent the stationary components of the device from rotating. Although this can be done with a fixed support, this does not permit mobility of the device nor does it permit the device to be located at the desired location within the moving water stream.

It is, therefore, a still further object of this invention to provide an improved supporting arrangement for a buoyant water powered device.

It is another object of this invention to provide a supporting arrangement for a buoyant water powered device wherein the torques generated by the device will be resisted or balanced.

Many of the previously proposed water powered devices have been designed so as to operate in a fixed location in the stream of water. Normally, they are anchored in some manner, for example, by using a rock and thus they are not able to be freely located in the portion of the stream where the current flow is the fastest. Thus, these devices do not make maximum utilization of the energy of the flowing water.

It is, therefore, yet another object of this invention to provide an improved water powered device which may be moored from the shore adjacent a moving body of water but which will relocate itself to the point where the water flow is the most rapid.

It is a further object of this invention to provide a water powered device embodying a float that will locate the device at the center of the flowing stream where the water flow is the fastest, which can be so moored from either bank and which also generates a lift force for resisting torques on the driven device.

In a floating device of the type described above wherein the float operates both to resist torques on the water powered device and also so as to move the water powered device into the more rapid portion of the stream, there is a danger that the forces on the float may cause the water powered device to assume an inclined angle with respect to the water flow. That is, if the forces are not balanced, there will be a turning force exerted on the axis of rotation of the water wheel which can cause portions of the water wheel to rise out of the water and lose efficiency. In addition, if the device is not uniformly submerged, there can be poor efficiency will result.

It is, therefore, a still further object of this invention to provide an improved float mechanism for a water powered device in which all forces are balanced.

It is yet another object of this invention to provide a float arrangement for a water powered device wherein tilting of the water wheel will be precluded.

Many times even though the water stream is moving, its velocity will be so slow as to result in the generation of insufficient power or force from the device to drive the driven element. It is, therefore, a still further object of this invention to provide an improved arrangement for a water powered device wherein the velocity of the flowing water is accelerated before it impinges on the water wheel.

Many of the proposed water powered devices have employed propellers or water wheels that are substantially fully submerged in the water. With such an arrangement, the devices normally must be positioned with their axis of rotation extending parallel to the direction of the flow of the water. This is clearly not acceptable in many circumstances. Furthermore, devices that require substantial submersion of the water wheel can only be used in relative deep flowing bodies of water. Many times the body of water has sufficient velocity to generate sufficient driving power but does not have any significant depth.

It is, therefore, a still further object of this invention to provide an improved buoyant water powered device which need not be submerged within the water.

It is a further object of this invention to provide an improved buoyant water powered device wherein a water wheel may float in relatively shallow water so as to generate driving power.

As has been noted, one of the main uses for water powered devices is in remote areas. In many instances, however, the water powered device is of such a size and configuration that it is difficult to move it into a remote location. Either the size or the weight of the device may make it difficult to manipulate.

It is, therefore, yet another object of this invention to provide an improved water powered device which may be rolled from one location to another by its very construction.

It is yet a further object of this invention to provide a water powered device wherein the water wheels are configured so as to act as wheels to permit the device to be rolled from one location to another.

It should be readily apparent that the output from a water powered device may be increased by using a number of either driving wheels or driven elements operating in ganged relationship. However, many of the devices previously proposed for this purpose have had such a construction that it is not possible to use a number of them together or it is not possible to use both multiple driving and driven members. It is, therefore, a still further object of this invention to provide an improved arrangement wherein a plurality of water wheels and/or water powered elements driven by the water wheels may be used in conjunction with each other.

As has been previously noted, one of the factors which has rendered previous water powered devices unsuitable for wide volume usage is the difficulties in anchoring or mooring the device within the moving stream of water. As has also been noted, many of the previous devices have required the provision of an anchor in the middle of the stream of the water and furthermore have necessitated positioning of the device driven by the water wheels in an above the water condition while the water wheels themselves are located below the water.

It is, therefore, a still further object of this invention to provide an improved construction for a water powered device and an improved manner for anchoring it.

It is another object of this invention to provide an supporting and anchoring arrangement for water powered devices that facilitates its use in a variety of different applications.

As has been previously noted, water powered devices of the type which form the subject of this invention are intended to be used at a plurality of different types of locations many of which are remote in nature. Also, a camper or person using the water powered device must transport the unit from one location to another during his travels. The assembled devices can be particularly large specifically when the employ an arrangement for resisting the torque loading on the device. Therefore, it is advantageous if the device is constructed in such a way that it may be readily assembled and disassembled and can be packed in a compact, easily carried manner.

It is, therefore, a still further object of this invention to provide an arrangement and construction for a water powered device which permits it to be conveniently knocked down and compactly stored.

It is yet another object of this invention to provide a water wheel arrangement for a water powered device wherein a plurality of water wheels may be nested together for storage and transportation.

Because of their very nature, water powered devices of the type which form the subject of this invention can be subject to damage. When the device is used in a moving steam of water, there is always the possibility that the blades or other components may be damaged. Of course, it is very desirable to provide an arrangement and construction wherein the damaged device may be conveniently repaired in site and wherein the user need not carry plurality of service parts and replacement parts for the device.

It is, therefore, a principal object of this invention to provide an improved water powered device and specifically a water wheel for such a device which is made up of a number of identical and easily replaced components.

One type of water powered device for which there is wide possible application is a water powered generator. Such devices may be conveniently used by campers or for a number of other applications wherein the device is floated within the water and can generate sufficient electricity for certain uses. However, because of its immersion or floatation in the water, it is essential that the electrical components be adequately protected from water damage.

It is, therefore, yet another object of this invention to provide a water powered device and specifically a driven element construction for it that affords good sealing, convenient assembly and disassembly and ease of servicing.

SUMMARY OF THE INVENTION

A first feature of the invention is adapted to be embodied in a water powered device that is moored in a moving water stream for deriving energy from the stream. The device comprises a support member, a water wheel that is carried by the support member and which is rotatable about an axis that extends perpendicularly to the direction of the stream flow. A water powered device is carried by the support member and is adapted to float in the water stream and be driven by the water wheel. The water powered device generates a torque on the support member about the water wheel axis. A lift generator means is carried by the support member at a point spaced from the water wheel axis and is adapted to cooperate with the water for generating a lift force to the support member for opposing the torque generated by the water powered device.

Another feature of the invention is also to be adapted to be embodied in a water powered device that is adapted to be moored in a moving water stream for deriving energy from the stream. Such a device also includes a support member and a water wheel carried by the support member and rotatable about an axis that is adapted to extend perpendicularly to the direction of stream flow. A water powered device is carried by the support member and is adapted to float in the water stream and be driven by the water wheel. Lift generating means is carried by the support member and is adapted to cooperate with the stream of water for generating a lift force to the support member and a force transverse to the direction of flow of the stream for generating a lateral force upon the support member for moving the support member in a direction transversely to the direction of flow of the stream.

Still another feature of the invention is adapted to be embodied in a water powered device that is adapted to be moored in a moving stream of water for deriving energy from the stream. Such a device also includes a support member, a water wheel carried by the support member and rotatable about an axis and a water powered device carried by the support member, adapted to float in the water stream and which is driven by the water wheel. Lift generator means is carried by the support member and is adapted to cooperate with the water for generating a lift force on the support member and a force transverse to the direction of flow of the stream for generating a lateral force on the support member for moving the support member in a direction transverse to the direction of flow of the stream. The forces generated on the support member are of such a magnitude and direction so as to prevent the exertion of a torque on the support member that would tend to rotate the support member.

Yet another feature of the invention is adapted to be embodied in a water powered device that is adapted to be driven by a moving stream of water and comprises a water wheel adapted to be rotatably driven about an axis by the water stream. A driven device has an input shaft driven by the water wheel. Flow directing means are associated with the water wheel for increasing the velocity of the stream as it passes across the water wheel.

A still further feature of the invention is adapted to be embodied in a water powered device that is adapted to be driven by a moving stream of water and which comprises a water wheel that is adapted to be rotatably driven about an axis by the water stream and a driven device having an input shaft that is driven by the water wheel. In accordance with this feature, buoyancy means are associated with the water wheel and driven member for maintaining the water wheel axis above the level of the water in the stream.

Another feature of the invention is also adapted to be embodied in a water powered device that is designed to be positioned in a stream of water to be powered by the water movement. The device comprises first, second and third axially spaced components. At least one of these components comprises a water wheel having a plurality of vanes and which is rotatable about an axis. At least another of the components comprises a water driven device comprises of an outer housing, a driven element contained within the outer housing and an input shaft driven by the water wheel for driving the driven element. At least two of the components have a cylindrical outer peripheral surface of greater diameter than the remainder of the components for rolling of the device along the ground on the two components outer peripheral surfaces.

A still further feature of the invention is also adapted to be embodied in a water powered device that is adapted to be positioned in a water stream so as to be powered by the water movement. At least three axially spaced components are adapted to be positioned in side-by-side relationship transversely across the stream. Each of the components comprises either a water wheel having vanes for rotating the water wheel about an axis upon movement of the stream of the water past the water wheel or a water driven component having an outer housing, a device contained within the outer housing and a shaft journaled within the outer housing, driven by the water wheel and driving the driven element.

An even further feature of the invention is adapted to be embodied in a water powered device that comprises a water wheel adapted to be rotatably driven by a stream of water about an axis extending transversely to the direction of water flow. First and second support means each adapted to extend in the general direction of water flow journal the water wheel at respective opposite sides. Means anchor the support means relative to the stream and a water powered device is driven by the water wheel.

A water powered device constructed in accordance with another feature of the invention also includes a water wheel that is adapted to be rotatably driven by a stream of water about an axis extending transversely to the direction of water flow. Water power means are driven by the water wheel and a support member is adapted to extend in a generally longitudinal direction relative to the stream and is affixed to the water wheel and the water powered device. Means are provided for anchoring the support member at a point spaced from the water wheel.

In another water powered device constructed in accordance with a still further feature of the invention a pair of water wheels are adapted to drive a water powered device. Each of the water wheels comprises an annular member having an axis of rotation, a plurality of blades extending in a cantilevered fashion from the annular member and generally parallel to the axis of rotation. The blades are circumferentially spaced from each other and the circumferential spacing of the blades relative to their width provides for nesting of the blades of one of the water wheels axially between the blades of another of the water wheels for packing with the respective annular members of the water wheel being axially spaced rom each other and separated by the length of the blades.

A buoyant water wheel forms another feature of the invention. Such a buoyant water wheel is comprised of a plurality of combined vane and hub sections adapted to be affixed together for ready replacement of damaged vane hub sections. Each vane hub section comprises a hub portion having a generally pie shaped section when viewed in an axial direction and which forms a segment of a cylinder. At least one vane extends radially outwardly from the hub portion. Means are provided for affixing a plurality of the vane and hub sections to a shaft with the hub portions being in abutting relationship to define a generally cylindrical hub surrounding the shaft and from which the vanes radially extend.

Yet another feature of the invention is adapted to be embodied in a water powered device that is adapted to be driven by a water wheel. The device comprises an outer housing having a plurality of cup shaped members that are surrounded by an annular peripheral flange. The cup shaped members are adapted to affixed together with the flanges in abutting relationship and defining an internal cavity. The cup shaped members each carry a bearing contiguous to their centers for journaling a shaft. A driven member is affixed to the shaft within the cavity. The flanges each are formed with respective gusset portions and the gusset portions define a recess for receiving a supporting member when the cup shaped members are affixed together. Locking means are provided for retaining the supporting member in the recess when the cup shaped members are affixed together.

BRIEF DESCRIPTION OF THE DRAWINGS

FIG. 24 is an end elevational view of the embodiment of FIG. 21 looking in the direction of the arrow 24 in FIG. 22.

FIG. 25 is a cross-sectional view taken through the axis of one of the water wheels of the embodiment of FIG. 21 and is taken along the line 25—25 of FIG. 26.

FIG. 26 is a cross-sectional view of the water wheel of this embodiment taken along the line 26—26 of FIG. 25.

DETAILED DESCRIPTION OF THE PREFERRED EMBODIMENTS

Embodiments of FIGS. 1 Through 9

Figure 1:
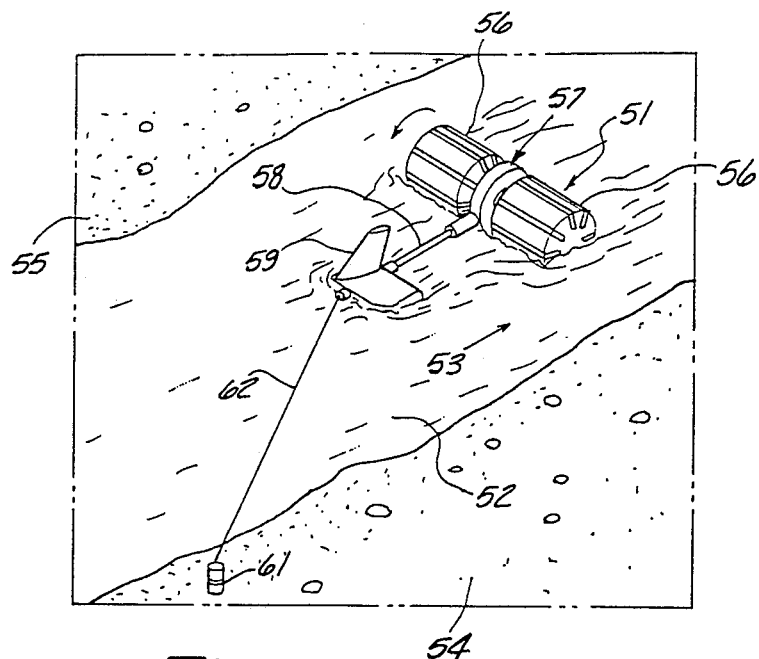
FIG. 1 is a perspective view showing a water powered device constructed in accordance with this invention as floating in a moving stream of water and moored from one bank thereof.
Figure 2:
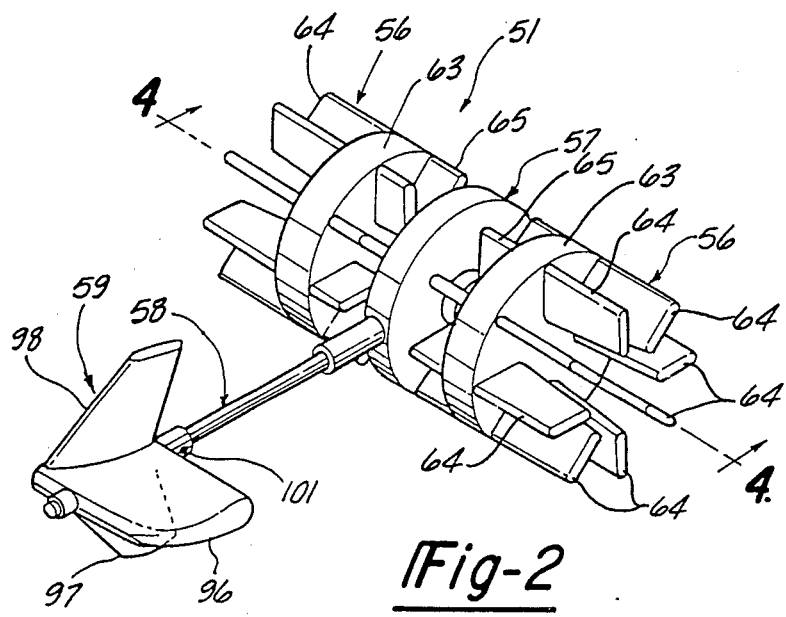
FIG. 2 is an enlarged perspective view of the device shown in FIG. 1.
Figure 3:
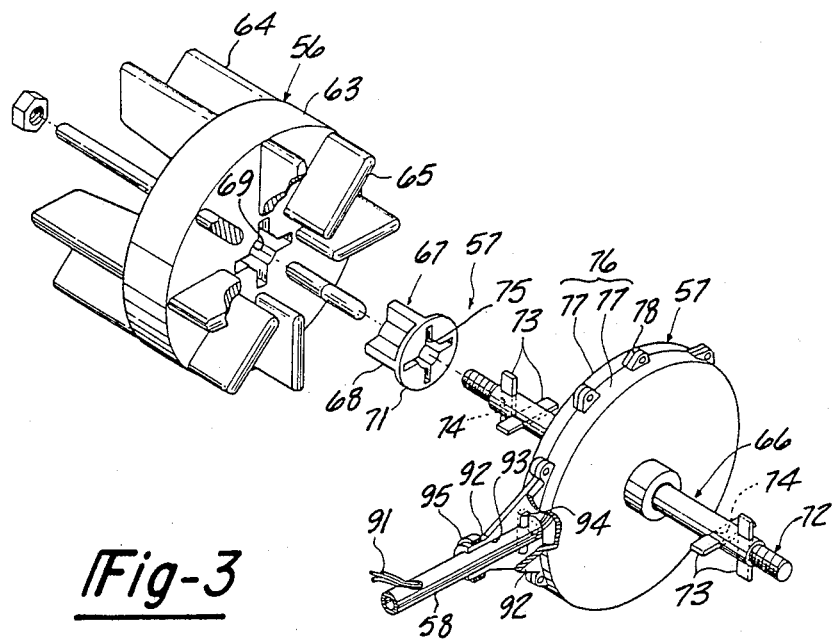
FIG. 3 is a partially exploded, enlarged perspective view showing the association of one of the water wheels with the water powered device.

A water powered mechanism constructed in accordance with this embodiment of the invention is identified generally by the reference numeral 51. The water powered mechanism 51 is particularly adapted to derive energy from a moving stream of water and referring in FIG. 1, such a stream in the form of a river is identified by the reference numeral 52. The river flows in the direction of the arrow 53 between its right and left banks 54 and 55, respectively.

Figure 5:
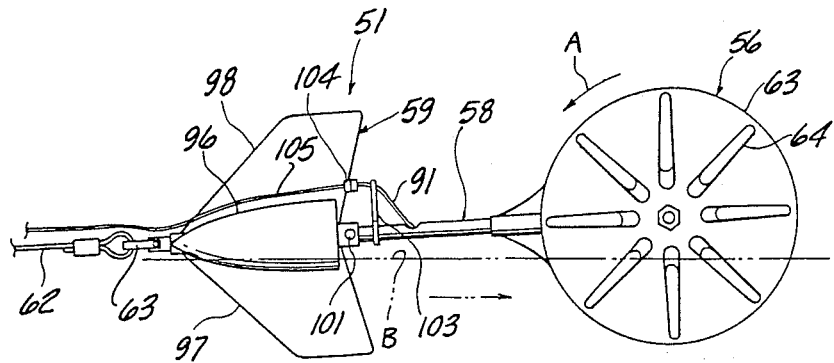
FIG. 5 is a side elevational view of the device.
Figure 6:
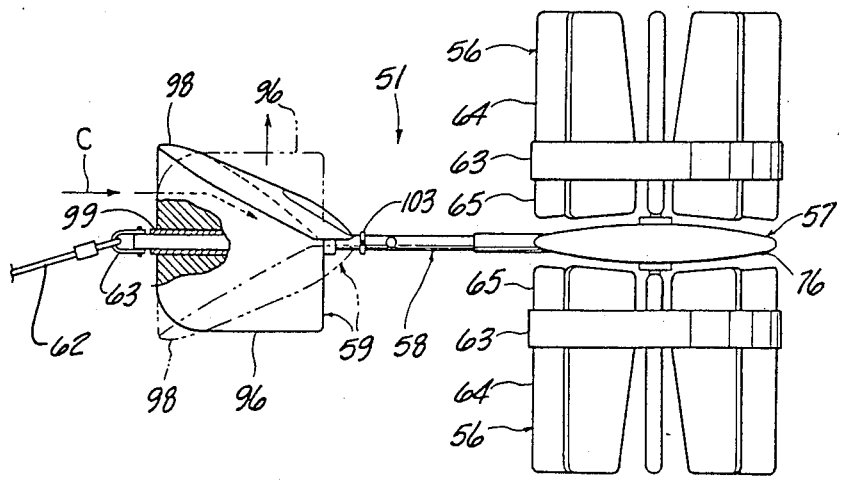
FIG. 6 is a top plan view of the device of this embodiment.

The mechanism 51 includes a pair of powering water wheels 56 which drive a water powered device, indicated generally by the reference numeral 57 and which may comprise an electrical generator, upon passage of the stream 52 past the water wheels 56, in a manner to be described. The assembly consisting of the water wheels 56 and water powered device 57 is supported by means of a supporting member 58 which comprises an elongated tubular member and a float assembly, indicated generally by the reference numeral 59. The float assembly 59 is constructed and arranged so as to provide a buoyant lifting force on the end of the supporting member 58 that opposes the torque generated by the water powered device 57 and which also generates a lateral force so as to move the assembly 51 into the center of the stream 52. As will be noted, the construction of the float 59 is such that the device 51 will be moved to the center of the stream 52 regardless of which river bank it is moored to. In FIG. 1, the device 51 is moored to the right hand bank 54 by means of an anchoring member 61 and anchor string or cord 62. The anchor cord 62 is detachably connected to an attachment member 63 carried by the front end of the support member 58 (FIGS. 5 and 6).

Each water wheel 56 is a buoyant member formed from a molded solid product made of foamed polystyrol or the like and comprises an annular or cylindrical hub portion 63 from one side of which integral axially extending vanes 64 extend. On the side opposite the vanes 64, the member 63 is formed with a plurality of shorter length vanes 65. Each water wheel 56 is affixed non-rotatably to a respective end of a water wheel shaft 66. The water wheel shaft 66 is tubular in construction and is journaled, in a manner to be described, in the driven member 57.

In order to non-rotatably connect each water wheel 56 to the shaft 66, there is provided a hub member, indicated generally by the reference numeral 67, which has an outer cruciform configuration 68 that is non-rotatably received within a corresponding opening 69 formed in the water wheel sections 63. The outer end of the members 67 has an annular flange 71 that is abuttingly engaged with the side or face of the circular portion 63 from which the vanes 65 extend.

A solid shaft 72 having threaded ends extends through the tubular shaft 66 and is held against rotation relative to the shaft by means of a pair of cross pins 73 each formed on a respective end of the shafts 66 and 72. The cross pins 73 extend through complementary shaped passages 74 formed in each shaft. Each hub member 67 is formed with a cruciform shaped opening 75 in which the cross pins 73 are received so as to non-rotatably couple the water wheels 56 to the shafts 66 and 72. The water wheels 56 are axially retained on the shaft 66 by means of nuts 75 that are threaded onto their exposed ends of shaft 72. Hence, the water wheels 56 are detachably connected to the shafts 66 and 72.

The water powered device 57 consists of an outer housing, which is non-rotatably connected to the supporting member 58 in a manner to be described. This housing assembly is formed from a suitable resin so as to be both buoyant and waterproof. The outer housing is indicated generally by the reference numeral 76 and comprises a pair of like shaped facing cup shaped members 77 each of which has a peripheral flange of circular configuration that is formed with lugs 78 that pass bolt and nut assemblies 79 for retaining the halves 77 together. The central portion of the cup shaped members are provided with hub like parts 81 in which anti-friction bearings 82 are carried for journaling the shaft 66. In addition, oil seals 83 are carried by the hub like projections 81 radially outwardly of the bearings 82 so as to prevent leakage.

The housing 76 has a generally hollow configuration so as to define an internal cavity 84 which aids in the buoyancy and in which a rotor 85 is positioned. The rotor 85 is non-rotatably affixed to the tubular shaft 66 and, hence, rotates with the water wheels 56.

In the illustrated embodiment, the device 57 comprises an electrical generator and hence a permanent magnet 86 is carried on the outer periphery of the driven member 85. The permanent magnet 86 cooperates with a stator ring 87 that is carried non-rotatably by the housing 76 and which is encircled by a winding 88 for generating an electrical potential upon rotation of the driven member 85 relative to the stator 87. A rectifier 89 may be provided for rectifying the voltage so as to provide an output which is delivered through a pair of conductors 91 which extend through the tubular member 58, in a manner to be described.

A drain plug 90 is removably contained within the housing 76 so as to permit drainage of water from within the housing. It should be noted that the housing 76 is intended to be at least partially submerged within the stream 52 and, hence, the device will receive some cooling by the flowing water stream. Because of its submersion, the components within the housing 76 may be suitably waterproofed, for example, by coating with epoxy.

The housing 76 and specifically the cup shaped members 77 are formed with respective gusset plates 92 which are adapted to mate with each other upon assembly and each of which is formed with a recess 93 that is adapted to receive the rear end of the support member 58 upon assembly. A retaining pin 94 passes through an opening in the rear end of the support member 58 and cooperates with complementary recesses in the gusset members 92 so as to axially affix the support member 58 relative to the water powered device 57 and specifically its outer housing 76. A clamping ring 95 encircles annular flanges at the forward end of the gusset members 92 so as to retain the assembly together.

It should be readily apparent that the rotation of the water wheels 56 and driving of the generator 57 creates a torque on the housing 76 which must be resisted. The float assembly 59 serves this purpose and additionally creates a transverse force on the assembly 51 to move it toward the center of the stream 52. The float assembly 59 is floatable and is formed from a molded solid product such as foamed polystyrol and includes a stabilizing member 96 that is adapted to float on the surface of the water and which has its top and bottom sides shaped like the bottom or keel of a ship so as to provide a hydrodynamic lift. Projecting upwardly and downwardly from the stabilizing member 96 are, respectively, a left hand biasing keel 97 and a right hand biasing keel 98. As may be readily seen in the figures and specifically FIG. 6, the keels 97 and 98 are oppositely directed so as to generate a transverse force on the float assembly 59 that will tend to move it and the remainder of the mechanism 51 toward the center of the stream 52 regardless of which bank it is moored to.

The float 59 is molded to a central tubular member 99 and is non-rotatably staked to the supporting member 58 by means of a pin 101. The pin 101 may be readily removed so as to selectively permit rotation of the float through 180° from the position shown in FIGS. 1 and 2 to a position wherein the keel 98 will be submerged and the keel 97 will be out of the water. The reason for this will become apparent as the description proceeds.

As has been noted, the wires 91 which provide the output from the generator 57 pass outwardly through an opening in the support member 58. Adjacent the float 59, the support member is provided with a standoff 103 and adjacent to the standoff the wires 91 are provided with a quick disconnect connector 104. This is adapted to cooperate with a complementary disconnect connector on an output cord 105 that may be suitably trained along to the shore along with the mooring rope 62. Hence, the electrical output from the generator 57 may be conveniently delivered to the shore.

Figure 7:
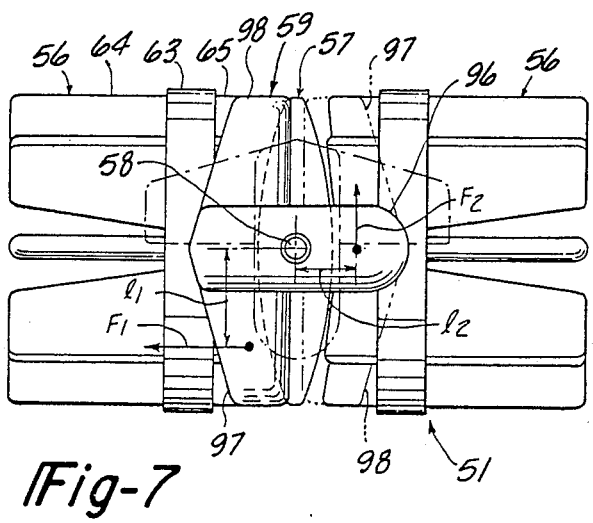
FIG. 7 is a front elevational view showing the device and a vector diagram indicating how the torques on the support member are balanced.
Figure 4:
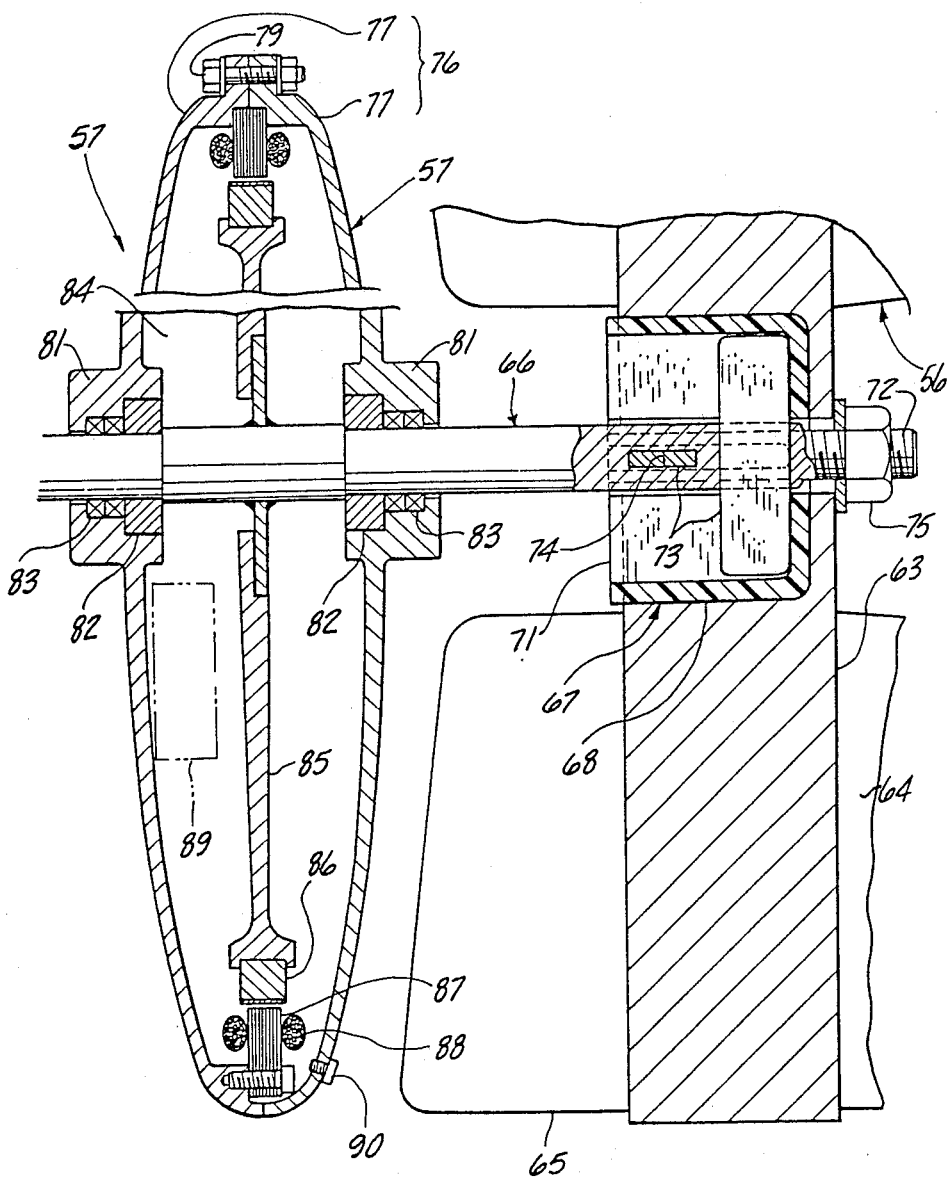
FIG. 4 is an enlarged cross-sectional view taken along the line 4—4 of FIG. 2 and shows the internal construction of the water powered device and the method of attachment of a water wheel to the driving shaft.

The operation of this embodiment will now be described. If the device is to be anchored at the right hand bank, the float 59 is assembled on to the supporting member 58 by removal and reinsertion of the pin 101 so that the left hand biasing keel 97 will be submerged and the right hand biasing keel 98 will be above the water. The anchor rope 62 is then connected, the stake 61 put in place, and the device 51 is placed into the water. The flow of water, even close to the bank where it is relatively slow, will create hydrodynamic forces on the float 59 as seen in FIG. 7 which create a first force $F_1$ to the left which tends to cause the assembly 51 to move out toward the center of the stream. The actual position can be determined by altering the length of the anchor cord 62 when the user determines that the water wheels 56 have reached the fastest moving part of the stream as may be readily discerned by watching the speed of rotation of the water wheels 56. As the speed of rotation increases and the output load of the generator 57 increases, there will be an increasing torque acting on the supporting member 58 and float 59. However, as the speed of the water increases, the hydrodynamic lifting force on the float portion 96 will increase so as to balance this loading. Hence, it will be insured that the device rides at the proper depth in the water and that it will float so that the axle 66 and specifically the rotational axes of the water wheels 56 will be above the water level. Hence, there will be a maximum power output. The lifting force is indicated by the force vector $F_2$ in FIG. 7.

It should be noted from this figure that the force $F_1$ and the force $F_2$ exert torques on the supporting member 58 acting through the respective lever arms $L_1$ and $L_2$, respectively. These forces and lever arms are chosen so that the torques will balance each other out and there will be no rotational force exerted on the supporting member 58 about its longitudinal axis. This will insure that the water wheels do not tend to rotate about an axis parallel to the axis of flow of the stream 53 so that they will be equally as well immersed in the water and there will no unevenness in their operation. That is, the rotational axis of the water wheels 56 will be held horizontally.

From FIGS. 5 and 7, it will be noted that the largest diameter of the water wheel 56, generator 57 assembly is that of the water wheel cylindrical portion 63. Hence, these portions can act as wheels so as to permit the entire assembly to be rolled along the ground for launching and also for moving to other locations.

If it is desired to anchor the device from the left hand shore, the pin 101 is removed and the float assembly 59 is rotated so that the keel 98 will be submerged and the keel 97 will be out of the water. In this way, a bias toward the right hand side will be exerted and the unit 51 will float outwardly away from the shore to where the velocity of the water is the greatest.

Figure 8:
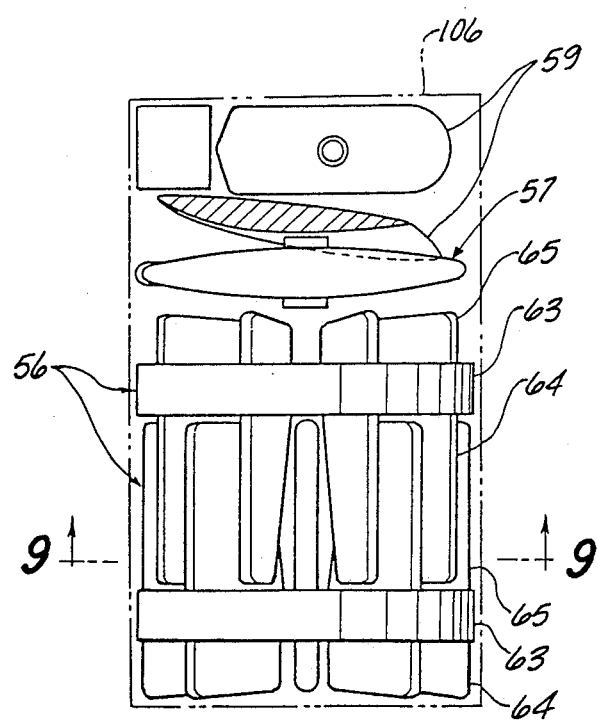
FIG. 8 is a side elevational view showing how the device may be disassembled and packed.
Figure 9:
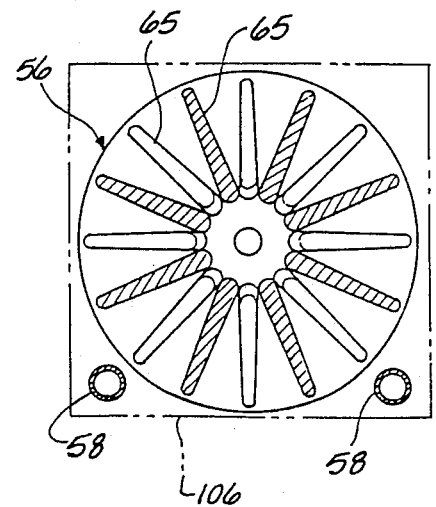
FIG. 9 is a top plan view of the packed construction.

In addition to being freely movable from one position to another by rolling the device along the wheels provided for by the cylindrical section 63 of the water wheels 56, the device is also constructed so that it may be conveniently packaged for moving. To this end, the vanes 64 are spaced apart at such a distance that when the water wheels 56 are removed from the shaft 62, they may be nested one within the other with the cylindrical portion 63 spaced apart as shown in FIG. 8. In addition, the various components may be contained within a box or enclosure 106 to provide a very compact configuration and one which may be conveniently handled and moved.

Figure 10:
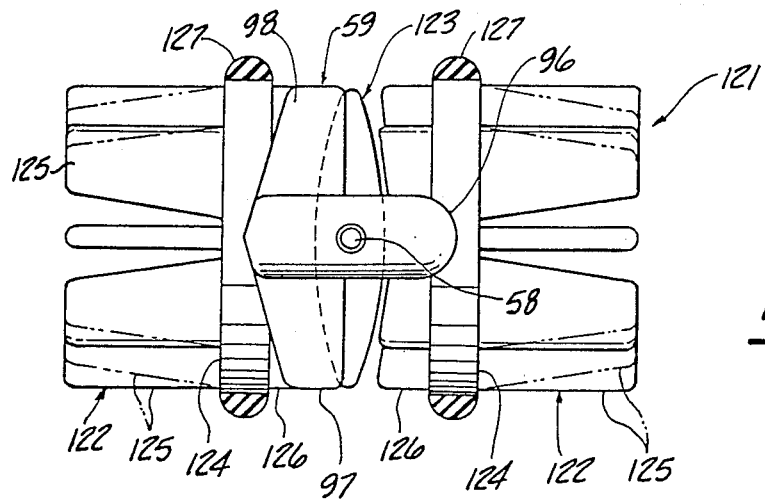
FIG. 10 is a front elevational view, in part similar to FIG. 7, showing another embodiment of the invention.

Embodiment of FIG. 10

FIG. 10 illustrates another embodiment of the invention wherein the general construction is similar to the embodiment of FIGS. 1 through 9 and, for that reason, components which have the same or generally the same construction have been identified by the same reference numeral and will be described only insomuch as is necessary to permit those skilled in the art to understand the construction and operation of this embodiment. Also, since the differences only involve the construction of the water wheels per se, only this portion of the overall construction has been illustrated.

In this embodiment, the mechanism is identified generally by the reference numeral 121 and includes a pair of water wheels 122 that are disposed on opposite sides of a water powered device 123, which like the previously described embodiment may be a generator. The water wheel assembly is connected to a supporting member 58 in the manner as previously described and a float assembly 59 is provided for supporting the forward end of the supporting member 58 and for resisting the various forces on the assembly and for exerting a lateral force on the assembly toward the center or desired position of the stream.

In this embodiment, each water wheel 122 is provided with a cylindrical section 124 which may be of the same or substantially the same diameter as the axially outwardly extending vanes 125. In addition, as with the previously described embodiment, there are shorter vanes 126 extending integrally from the opposite sides of the cylindrical sections 124. In this embodiment, rubber tires 127 are received over each of the cylindrical sections 124 so as to provide a cushioned support for rolling of the device from position to position. In addition, the vanes 125 may have a tapered condition as shown by the dot-dash lines in FIG. 10 so as to accommodate changes in terrain. In other regards, this embodiment is the same as the embodiment of FIGS. 1 through 9 and, for that reason, further description of this embodiment is not believed to be necessary.

Embodiments of FIGS. 11, 12, 13, 14 and 15

In the embodiments thus far described, the device comprises a pair of water wheels which are coupled together and each of which drive a common water powered device such as a generator. FIGS. 11 through 15 show a number of different embodiments wherein different ganging relationships are possible and which may serve varieties of functions. In describing these embodiments, the water wheels have each been identified by the reference numerals 56, the water powered devices or generators have been each identified by the reference numerals 57, and the floats or buoyancy members have each been identified by the reference numerals 59.

Figure 11:
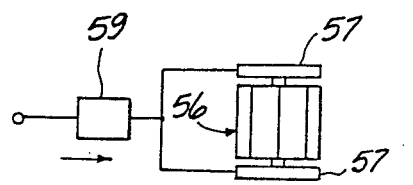
FIG. 11 is a top plan view showing another embodiment of the invention.

FIG. 11 shows an embodiment wherein a single buoyant device 59 supports a pair of generators or water powered devices 57 which are each positioned on opposite sides of a single water wheel 56.

FIG. 11 illustrates an embodiment which is considered to be a multiple of the embodiment shown in FIG. 11 in that two water wheels 56 are provided in conjunction with three water powered devices 57 or generators with the arrangement being generator, water wheel, generator, water wheel and generator, all carried by a single floatation device 59.

Figure 12:
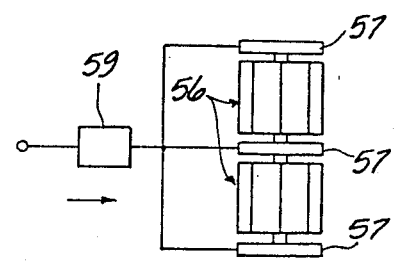
FIG. 12 is a top plan view, in part similar to FIG. 11, showing a further embodiment.
Figure 13:
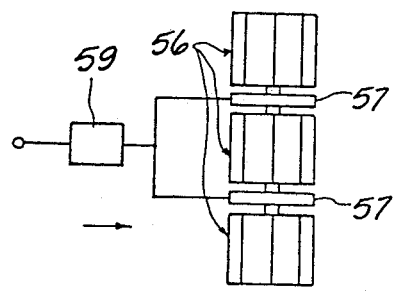
FIG. 13 is a top plan view, showing a still further embodiment of the invention.

FIG. 13 illustrates what might be considered to be the inverse of FIG. 12 in that the relationship is three water wheels for two generators and the arrangement transversely from one side to the other is water wheel, generator, water wheel, generator and water wheel. Again, a single floatation device 59 supports the entire assembly.

Figure 14:
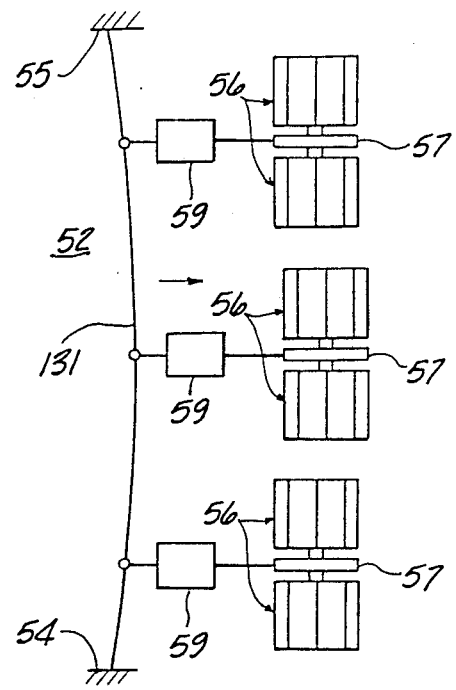
FIG. 14 is a top plan view, showing yet another embodiment.

FIG. 14 illustrates another embodiment incorporating a relationship between water wheels 56 and generators 57 as shown in FIGS. 1 through 9 wherein a single generator 57 is driven by a pair of water wheels 56 positioned on each side. Each device is supported by a floatation unit 59 and the floatation units 59 are disposed in side-by-side relationship and are all supported within a river body 52 between its opposite banks 54 and 55 by a single anchor rope 131 that extends transversely across from one bank 54 to the other bank 55.

Figure 15:
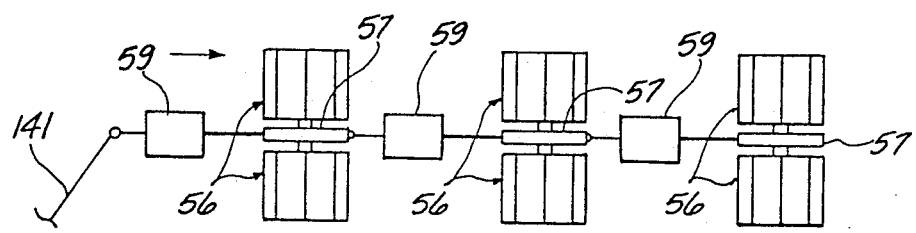
FIG. 15 is a top plan view, showing a still further embodiment.

FIG. 15 shows another ganging arrangement embodying water wheel generator combinations as shown in FIGS. 1 through 9. In this embodiment, however, the individual units are disposed in a series type of relationship and an anchor rope 141 connects a float 59 of the first water wheel, generator combination 56, 57 to the bank. The next water wheel, generator combination has its float 59 connected to the housing of the generator 57 of the immediately upstream unit. A number of units of this type may be arranged one downstream of the others in any desired number.

Figure 16:
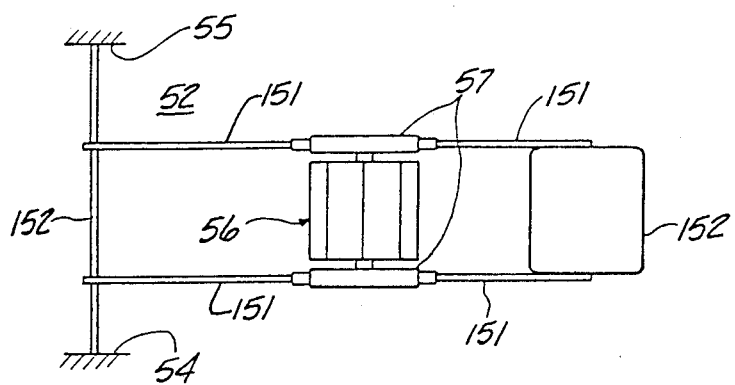
FIG. 16 is a top plan view, showing yet another embodiment.
Figure 17:
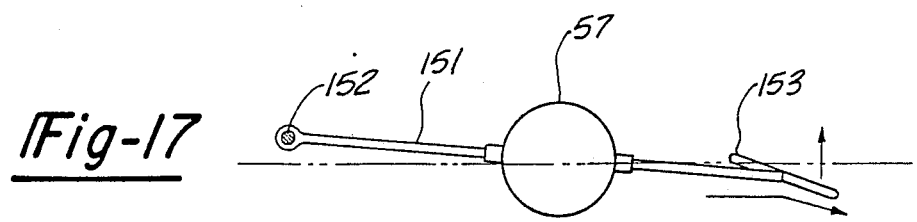
FIG. 17 is a side elevational view of the embodiment of FIG. 16.

Embodiment of FIGS. 16 and 17

In this embodiment, the major components are the same as the previously described embodiments except as will be hereinafter noted. Hence, those components which are the same in construction as the previously described embodiments are identified by the same reference numeral and their detailed description will not be repeated.

In this embodiment, a single water wheel 56 is positioned and rotatably journaled between a pair of driven members 57 such as electrical generators. Each member 57 has extending forwardly from its outer housing a respective support member 151 and the support members 151 are tied together at their forward ends by a transversely extending member 152. The member 152 is suitably staked to the banks 54 and 55 of the stream 52.

In this embodiment, the supporting members 151 are extended downstream beyond the generators 57 and a transversely extending wing shape float member 153 extends transversely across the stream 52 so as to provide a lifting force to the rear ends of the support members 51 and, accordingly, the float 51 and generators 57. Hence, this will further insure that the unit does not become submerged to great an extent in the water.

Figure 18:
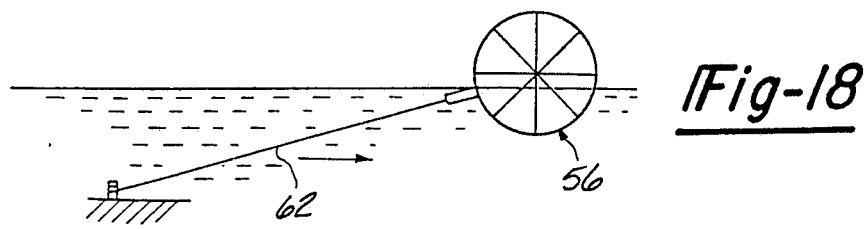
FIG. 18 is a side elevational view of yet another embodiment.
Figure 19:
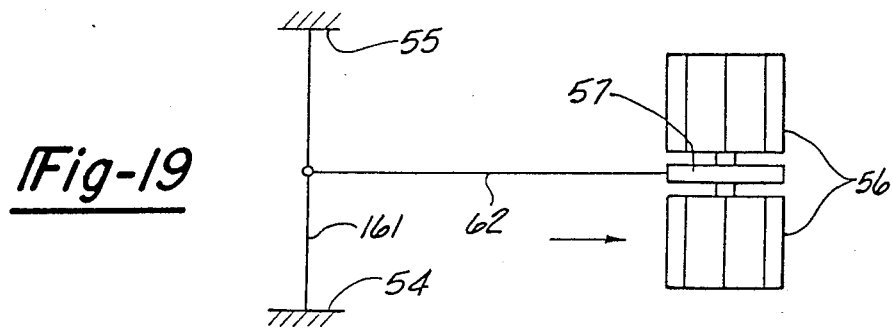
FIG. 19 is a top plan view of further embodiment.
Figure 20:
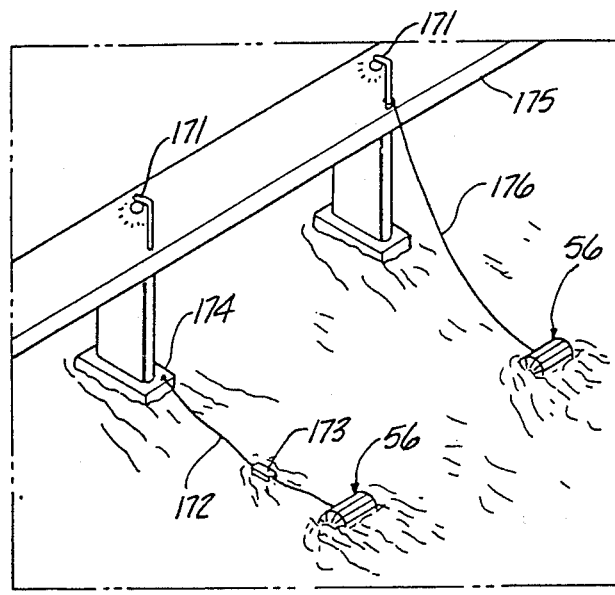
FIG. 20 is a perspective view showing two additional embodiments.
Figure 21:
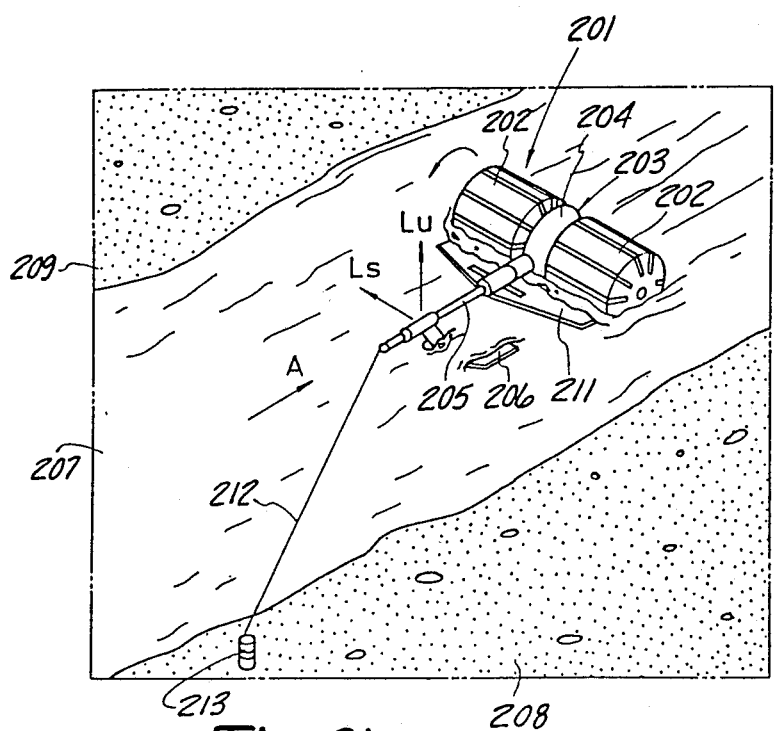
FIG. 21 is a perspective view, in part similar to FIG. 1, showing a further embodiment of the invention.

Embodiments of FIGS. 18 Through 20

FIGS. 18 through 20 show other arrangements for mooring the water powered devices. It should be understood that these mooring arrangements may be utilized in conjunction with water powered devices having any of the configurations as shown in FIGS. 11 through 15. For this reason, the water wheels and generators or other water powered devices have been indicated by the same reference numerals previously employed (56 and 57) and these components will not be described again. Only the mooring arrangement will be described in each embodiment.

In the embodiment of FIG. 18, the water wheel 56 and its associated generator 57 is anchored to the river bed by means of an anchoring cable 62. In the embodiment of FIG. 19, an anchoring cable 62 is connected to a transversely extending support rod 161 that extends across and is affixed in a suitable manner to the opposite river banks 54 and 55.

FIG. 20 shows two embodiments in which the generating device may be employed in connection with a bridge for illuminating street lights 171 on the bridge. In one of these embodiments, as shown at the left hand side, the generator and water wheel combination is connected by means of an anchor cable 172 and associated float 173, which float may have any of the previously described constructions, to a pier 174 of the bridge. The bridge is identified by the reference numeral 175. In the other embodiment as shown in the upper portion of this view, an anchor cable 176 directly connects the device to the pole of the street lamp 171 and, hence, a float is not employed or necessary.

Embodiment Of FIGS. 21 Through 29

In the embodiments previously described, in addition to the buoyancy of the water wheels and floats, there is provided a buoyant or float member for assisting in resisting the torque generated by the electrical generator and for locating the device relative to the stream of moving water. FIGS. 21 through 29 show another embodiment of the invention wherein the device is located by a dynamically operating member rather than one that operates by both dynamics and buoyancy. In addition, an improved water wheel construction is illustrated in this embodiment and which functions to facilitate servicing.

The water powered mechanism constructed in accordance with this embodiment is identified generally by the reference numeral 201. In this embodiment, there are a pair of water wheels 202 positioned on opposite sides of and driving an electrical generator 203. As with the previously described embodiments, the unit 203 may be of any other water power type and has an outer housing 204 which may be of the type described in connection with the embodiment of FIGS. 1 through 9. Also, although the arrangement is described in conjunction with a pair of water wheels driving a single driven element, any of the other configurations previously described, such as those in FIGS. 11 through 13.

A supporting member 205 is affixed to and extends forwardly of the driven member outer housing 204 in the manner as already described. Carried by the supporting member 205 in an adjustable manner, as to be described, is a hydrofoil 206 that provides a lifting force $L_u$ to add to the buoyancy and also a transverse force $L_s$ to move the unit 201 to the center of the stream of the river. The river or stream is identified by the reference numeral 207 and flows in the direction A between a right hand bank 208 and a left hand bank 209.

In addition to the hydrofoil 207, there is provided a further foil 211 which is adjustably connected to the support member 205 in closer proximity to the water wheels 202. As will be described, the guiding foil 211 acts to provide a lift and also accelerates the flow of the water past the vanes of the water wheel 202.

The mechanism is secured to one or the other of the banks 208 and 209 by an anchor rope 212 that is connected to a stake 213 placed in the appropriate bank.

The construction of the water wheels 202 will be described by particular reference to FIGS. 25 and 26. In this embodiment, the water wheels 202 are designed in such a manner as to be readily repairable upon damage and are comprised of a plurality of individual blade and hub portions 214. Each portion 214 is of the same configuration so that plural and different pieces are avoided. The pieces 214 are conveniently molded from a floatable plastic such as foam polystyrol.

Each piece 214 is comprised of a hub portion 215 that has the shape of a segment of a pie and which when mated with adjacent hub portions forms a complete cylindrical section. That is, each of the pie shaped hub portions 215 is a cylindrical segment. One or more blades 216 extend radially outwardly from each hub portion.

As may be best seen in FIG. 25, the hub portions are formed with generally tapered outer faces 217 on their opposite sides. Also, the sections define an internal recess 218 that is adapted to pass a shaft 219. A pair of cup shaped members 221 and 223 are affixed to the shaft 219 so as to frictionally hold the segments 214 together and also so as to press them into frictional engagement with the shaft 219 so as to establish a rotating connection between the sections 214 and the shaft 219. For this purpose, a first pin 224 is staked through the cup shaped member 221 to axially and non-rotatably affix it to the shaft 219. The other member 223 is axially pressed along the shaft by means of a nut 225 and is staked against rotation by means of a pin 226 that passes through an enlarged opening 227 in the shaft and in the cup shaped member 223.

It should be readily apparent that this construction is such that if any of the portions 214 is damaged, it may be easily replaced by loosening the nut 225 and removing one of the pins 226 or 224 and removing the damaged section and replacing it with a new one.

Figure 28:
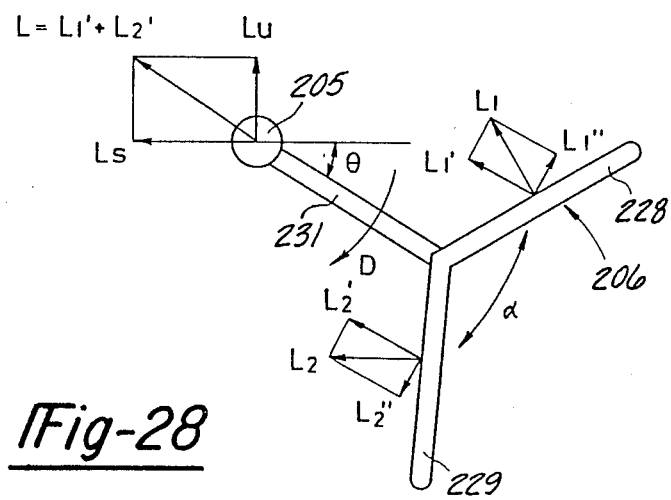
FIG. 28 is a vector diagram in a front elevation showing how the floatation device of this embodiment operates.

Unlike the previously described embodiments, the hydrofoil section 206 provides its lift and translational forces through dynamic action rather than through buoyancy or buoyancy in combination with these actions. The hydrofoil 207 has two angularly related blades are integrally connected to each other and which are identified by the reference numerals 228 and 229. The blade 229 is intended to provide primarily the translational force while the blade 228 is intended to provide primarily the lifting force. It is to be understood, as will be described, however, that the blades 228 and 229 work together and each provides a portion of each force. As seen in FIG. 28, the blades 228 and 229 are disposed at an angle $\alpha$ with respect to each other.

A generally cylindrical post 231 is affixed to the hydrofoil 206 adjacent its bight. The post 231 is, in turn, affixed, as by welding, at its other end to a tubular sleeve 232 that has an inner diameter that is complementary to the outer diameter of the tubular supporting member 205 so as to be slidably received thereupon. The ends of the sleeve 204 are provided with slits 233 so as to provide some resilience in this area. A pair of hose type clamps 234 are received on the slits and tighten the tubular member 232 so as to fix it in position both angularly and axially on the supporting member 205.

Because of the manner in which the hydrofoil 206 is connected to the supporting member 205, it is possible to adjust its position both axially along the supporting member 205 and also its normal angle θ with respect to the axis of rotation of the water wheels 202 (FIG. 28). By making such an adjustment, it is possible to adjust both the lift $L_u$ and the force $L_s$ tending to drive the unit 201 toward the center of the body of water. In addition, by reversing the position of the hydrofoil 206 on the supporting shaft 205, it is possible to obtain a transverse force that is operative to drive the device 201 to the center of the stream 207 regardless of which bank the device is anchored to.

The cooperation of the blades 208 and 209 in providing the lifting and transverse forces may be best understood by reference to the vector diagram, FIG. 28. The lift $L_1$ established at the blade 208 can be divided into a component $L_1'$ parallel with the post 231 and a component $L_2'$ perpendicular to the post 231. The lift $L_2$ established at the blade 231 can be divided into a component $L_1'$ parallel with the post 231 and a component $L_2'$ perpendicular to the post 231. Hence, the lift L to be applied to the support 205 through the post 231 is expressed by: $L_1' + L_2'$. If the angle of inclination of the post 231 with respect to the horizontal direction is designed as 0, the aforementioned components $L_u$ and $L_s$ are expressed by the following equations:

$$L_u = (L_1' = L_2') \sin 0;$$

and $$L_s = (L_1' + L_2') \cos 0.$$

As is apparent from these equations, by adjusting the angle 0 of the post 231, it is possible to adjust the component $L_u$ for overcoming the reactive torque and the component $L_s$ for directing the member 201 to the stream center. Moreover, the opening angle α between the blade 228 and 229 can be set at an arbitrary value smaller than 180° but is desired to have such a value that the hydrofoil 206 does not protrude excessively from the water surface W when the attaching angle 0 of the member 231 is small.

Figure 22:
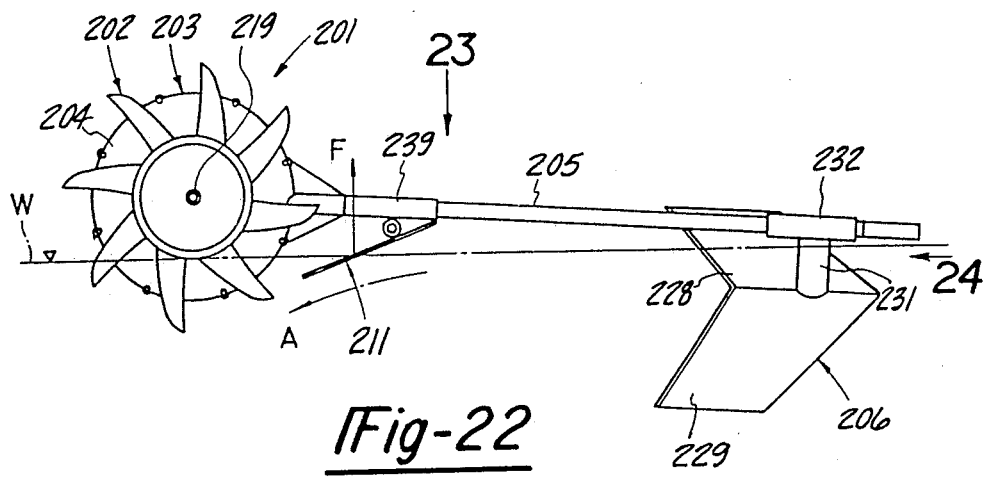
FIG. 22 is a side elevational view of the embodiment of FIG. 21.
Figure 23:
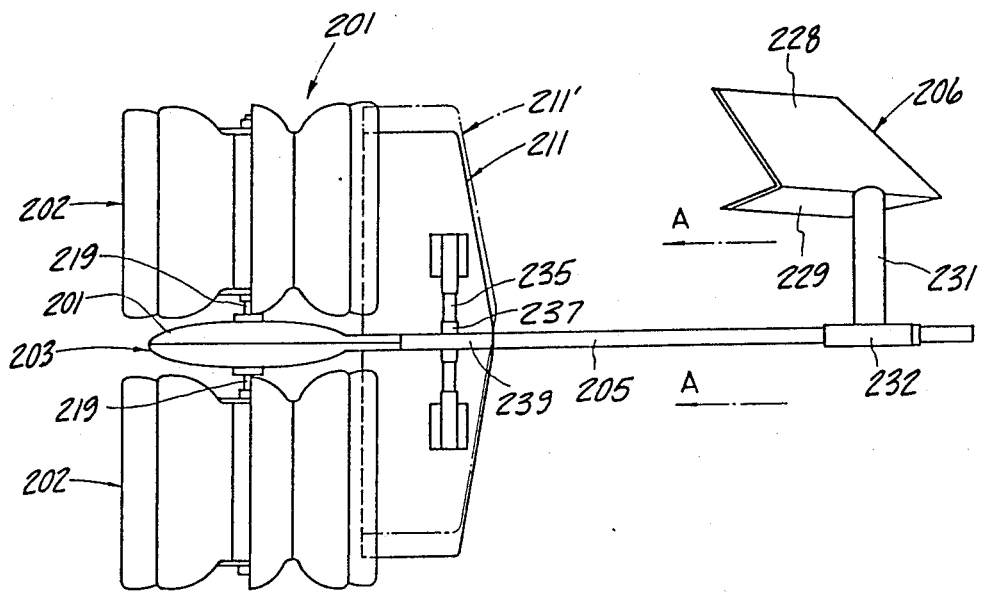
FIG. 23 is a top plan view of the embodiment of FIG. 21 looking in the direction of the arrow 23 in FIG. 22.
Figure 27:
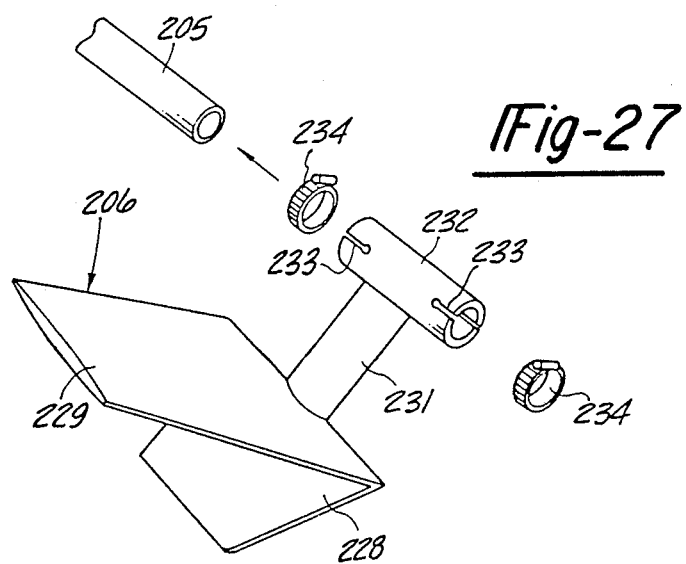
FIG. 27 is an exploded perspective view showing how the floatation device of this embodiment is connected to the supporting member.
Figure 29:
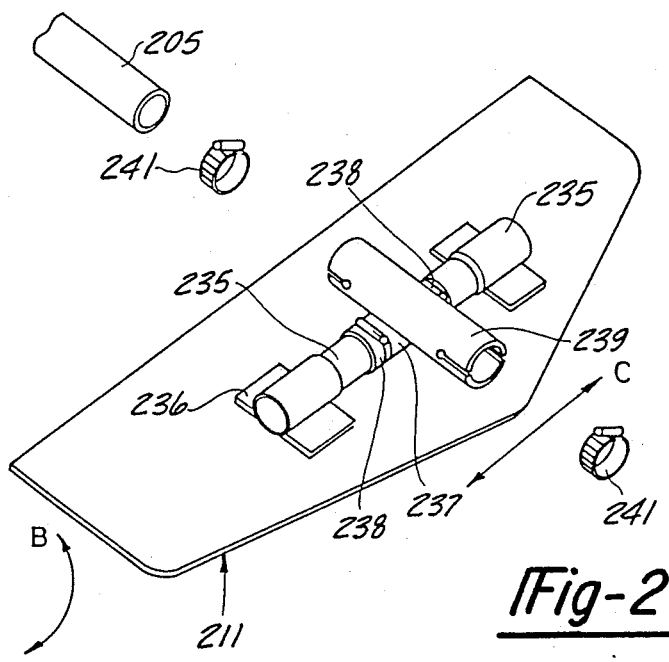
FIG. 29 is an exploded perspective view of another of the floatation devices of this embodiment.

Referring now primarily to FIGS. 23 and 29, the operation of the hydrofoil 211 and its construction will be described. The hydrofoil 211 is designed to provide a lifting force to assist in the buoyancy of the water wheels 202 and to insure that the axis of the shaft 219 remains out of the water at all times. In addition, the hydrofoil blade is related to the water wheels 202 so as to increase the velocity of the water as it passes over tips of the blades 214 (FIG. 22). The blade 211 has a generally planar configuration and carries a cross shaft 235 that is affixed to the upper side of the blade or hydrofoil 211 by means of brackets 236. The shaft 235 is encircled by a sleeve 237 which is slotted at its ends and which slotted ends are rotatably or adjustably affixed to the shaft 235 by means of clamps 238. Hence, the angle of attack of the blade or hydrofoil 211 may be adjusted relative to the supporting member 202 by loosening the clamps 238 and readjusting the angular position of the sleeve 237 on the shaft 235.

In addition, the loosening of the clamps and the transverse disposition of a cross tube 239 which is affixed to the tube 237 permits transverse adjustment of the hydrofoil for a reason to be described. The tubular shaft 239 is slidably supported on the supporting member 205 and is held in place by means of clamps 241 that are received over its slotted ends. Hence, the foil 211 may be adjusted both axially relative to the supporting member 205, transversely relative to it in the direction of the arrow C in FIG. 29, and its angle may be changed as shown by the arrow B in this figure.

By changing the angular disposition and its axial location, the hydrofoil 211 may be adjusted so as to direct the water velocity A (FIG. 22) so it will pass across the tips of the vanes of the water wheel and accelerate the vanes so as to insure a good generation of power even when the water is traveling at a relatively slow or sluggish rate.

In addition, this adjustment will change the lifting force and will provide additional help in insuring that the water wheel 202 does not become submerged too deeply in the body of water. By adjusting the device transversely in the direction of the arrow C relative to the pipe 205, the guiding foil 211 can be offset so as to suppress any transverse rolling which might be accomplished because of the result of fluctuation of the driving torque of the generator 203 which will change the depth of the forward foil 209 in the water and, accordingly, its lift. By providing the offset as shown in the phantom line 211' in FIG. 23, it is possible to provide different lifts on opposite sides of the member and thus make sure that the water wheels are maintained always in a horizontal condition.

Figure 30:
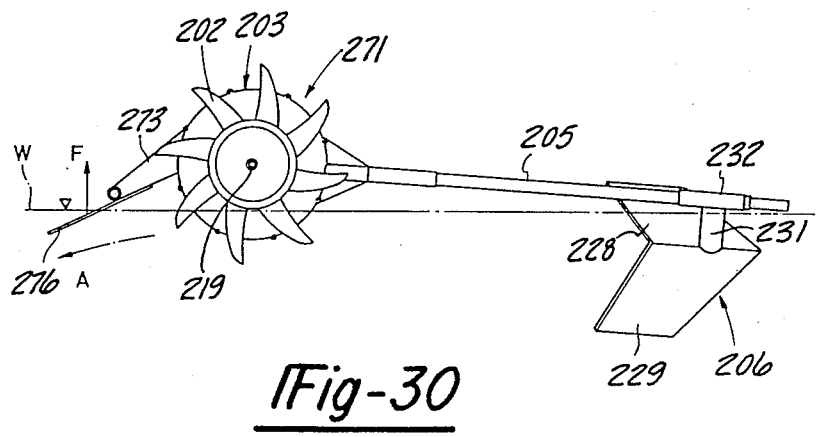
FIG. 30 is a side elevational view, in part similar to FIG. 22, showing yet another embodiment of the invention.
Figure 31:
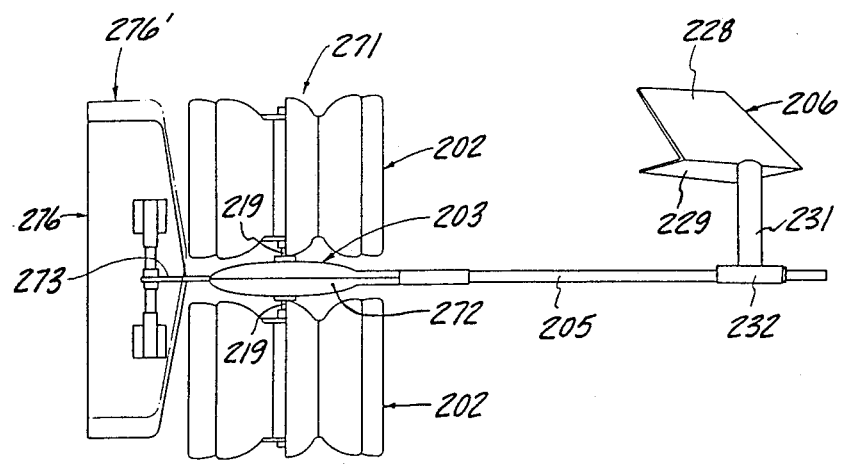
FIG. 31 is a top plan view of the embodiment of FIG. 30.
Figure 32:
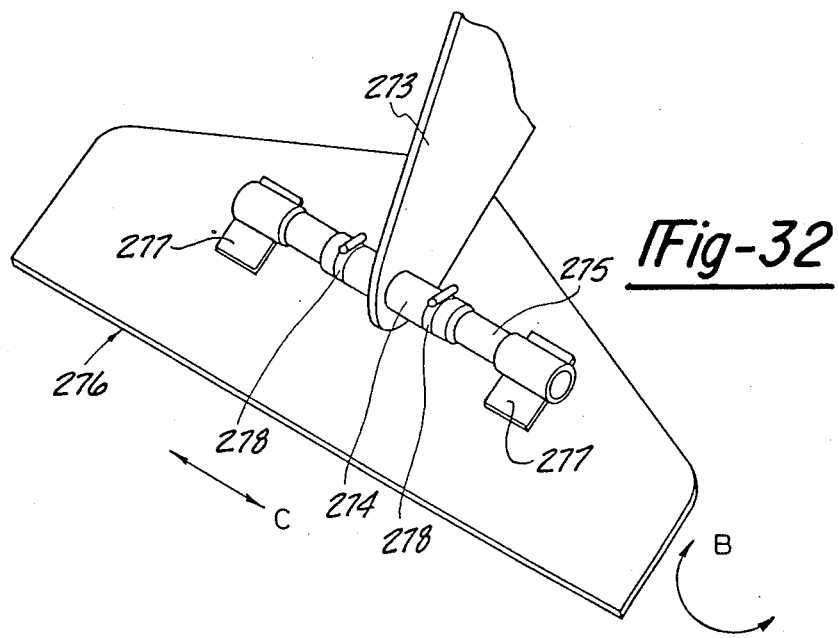
FIG. 32 is a perspective view showing how one of the floatation devices of the embodiment of FIGS. 30 and 31 is attached to the supporting member.

Embodiment of FIGS. 30 Through 32

The embodiment of FIGS. 30 and 32 is substantially the same as the embodiment of FIGS. 21 through 29. However, in this embodiment, the rear foil is positioned to the rear of the water wheels and, hence, does not operate to accelerate the water passing across their blades. In all other regards, however, this embodiment is the same as the embodiment of FIGS. 21 through 29 and those components which are the same have been identified by the same reference numerals and will not be described again.

In this embodiment, the mechanism is identified generally by the reference numeral 271 and the generator 203 and water wheels 202 are the same. In this embodiment, however, a casing 272 of the generator 203 is provided with a rearwardly extending bracket 273. The bracket 273 is rigidly connected to a tubular member 274 that slidably receives a shaft 275 that is affixed to the upper side of a rear hydrofoil 276 by means of end brackets 277. The tubular member 274 has its ends slit and is affixed relative to the shaft 275 by means of clamps 278. By loosening the clamps 278, it is possible to transversely adjust the hydrofoil 276 in the direction of the arrow C in FIG. 32 so that it may be moved to an offset position as shown at 276' to compensate for and avoid horizontal lift of the water wheels. In addition, the angle may be adjusted in the direction of the arrow B so as to change the angle of attack and accordingly the lift force F. In other regards, this embodiment is the same as the previously described embodiments and this construction should be apparent to those skilled in the art.

From the foregoing, it is believed to be clear that a number of embodiments of the invention have been illustrated and described each of which provides a number of useful functions and which achieves good power derivation from a steam of water even if the device is anchored at one side of the stream because the device will be carried into the center of the stream and its position can be adjusted as described. Although the device has been described in conjunction with powering of an electrical generator, as has been noted other types of devices such as water pumps or the like can be driven. In addition to the embodiments illustrated and described, various changes and modifications may be made without departing from the spirit and scope of the invention, as defined by the appended claims.

We claim:

1. A water powered device adapted to be positioned in a stream of water to be powered by the water movement, said device comprising first, second and third axially spaced components, at least one of said components comprising a water wheel having a plurality of vanes and being rotatable about an axis, and at least another of said components comprising a water driven device comprising an outer housing, a driven element contained within said outer housing and having an input shaft driven by said water wheel for driving said driven element, at least two of said components having a cylindrical outer peripheral surface of greater diameter than the remainder of said two components and the remaining component for rolling of said device along the ground on said two component outer peripheral surfaces.

2. A water powered device as set forth in claim 1 wherein the two components having the cylindrical outer peripheral surfaces comprise water wheels disposed on opposite sides of the remaining component which comprises the driven device.

3. A water powered device as set forth in claim 2 wherein the driven device comprises an electrical generator.

4. A water powered device as set forth in claim 3 wherein each of the water wheels comprises an annular member having an axis of rotation and defining the cylindrical outer peripheral surface and further including a plurality of blades extending in a cantilevered fashion from said annular member and generally parallel to said axis of rotation, said blades being circumferentially spaced from each other.

5. A water powered device as set forth in claim 4 wherein the water wheels are each detachably affixed to the input shaft and wherein the circumferential spacing of the blades relative to their width provides for nesting of the blades of one of said water wheels axially between the blades of the other of said water wheels when said water wheels are disassembled from said shaft for packing of the respective water wheels with their annular members spaced axially from each other and separated by the length of said blades.

6. A water powered device as set forth in claim 1 further including rubber tire means contained around the cylindrical outer peripheral surface for supporting the water powered device during its rolling motion.

7. A water powered device as set forth in claim 6 wherein the two components having the cylindrical outer peripheral surfaces comprise water wheels disposed on opposite sides of the remaining component which comprises the driven device.

8. A water powered device capable of being dissasembled and packed for movement from place to place, said water wheel comprising a pair of water wheels detachably connected to drive a water powered device, each of said water wheels comprising an annual member having an axis of rotation, a plurality of blades extending in a cantilevered fashion from said annular member on on side thereof and extending generally parallel to said axis of rotation, said blades being circumferentially spaced from each other, the circumferential spacing of said blades being related to their width for nesting of the blades of one of said water wheels axially between the blades of another of said water wheels for packing when dissasembled from said water powered device with the respective annular member of said water wheels being axially spaced from each other and separated by the length of said blades.

9. A water powered device as set forth in claim 8 wherein each of the water wheels comprises a second plurality of blades extending in a cantilevered fashion from the other side of the annular member, said second series of blades being substantially shorter in length than the first mentioned plurality of blades.

10. A water powered device as set forth in claim 9 wherein the annular member has a greater diameter than the diameter of the blades.

11. A water powered device as set forth in claim 8 wherein the water wheels are each adapted to be detachably connected to an associated shaft and the water powered device is carried by the shaft and driven thereby.

12. A water powered device as set forth in claim 11 wherein the water wheels are non-rotatably keyed to the shaft.

13. A water powered device as set forth in claim 12 wherein the water wheels are non-rotatably keyed to the shaft by means of a pair of angularly disposed members affixed to the shaft and a corresponding shaped cruciformed opening formed in each of the water wheels.

14. A water powered device adapted to be driven by a water wheel comprising an outer housing having a pair of generally cup shaped members surrounded by an annular peripheral flange, said cup shaped members being adapted to be affixed together with said flanges in abutting relationship and defining an internal cavity, said cup shaped members each carrying a bearing contiguous to their centers for journaling a shaft, a driven member affixed to said shaft within said cavity, said flanges each being formed with a respective gusset portion, said gusset portions defining a recess for receiving a supporting member when said cup shaped members are affixed together, and locking means for retaining said supporting member in said recess of said gussets when said cup shaped members are affixed together.

15. A water powered device as set forth in claim 14 wherein the locking means comprises a pin extending through the supporting member and retained by the gussets.

16. A water powered device as set forth in claim 15 wherein the pin is retained within complementary shaped openings formed in the gussets.

17. A water powered device as set forth in claim 14 wherein the gussets form a circumferential flange around the support member and a clamping band is received therearound.

18. A water powered device as set forth in claim 14 wherein the water powered device comprises a generator, the driven member comprising a member carrying a permanent magnet and cooperating with a stator and winding carried by the outer housing.

19. A water powered device as set forth in claim 18 further including a water wheel affixed to the shaft for driving the generator.

20. A water powered device as set forth in claim 19 wherein the water wheel and water powered device are buoyant for floating in a body of water.

* * * * *